(12) United States Patent
Smith

(10) Patent No.: US 6,606,640 B2
(45) Date of Patent: Aug. 12, 2003

(54) METHOD, COMPUTER PROGRAM PRODUCT, AND SYSTEM FOR MODIFYING POPULATED DATABASES UTILIZING A RELOAD UTILITY

(75) Inventor: Alan R. Smith, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 09/893,381

(22) Filed: Jun. 26, 2001

(65) Prior Publication Data

US 2002/0198860 A1 Dec. 26, 2002

(51) Int. Cl.[7] ............................................. G06F 17/00
(52) U.S. Cl. ........................ 707/203; 707/200; 707/201; 707/205
(58) Field of Search ..................................... 707/1–206

(56) References Cited

U.S. PATENT DOCUMENTS

| | | | |
|---|---|---|---|
| 4,037,205 A | 7/1977 | Edelberg et al. | 364/900 |
| 5,455,945 A | 10/1995 | VanderDrift | 395/600 |
| 5,806,058 A | 9/1998 | Mori et al. | 707/2 |
| 5,842,196 A | 11/1998 | Agarwal et al. | 707/2 |
| 6,029,178 A | 2/2000 | Martin et al. | 707/201 |
| 6,070,170 A | 5/2000 | Friske et al. | 707/202 |
| 6,208,998 B1 | 3/2001 | Marcus | 707/104 |
| 6,532,478 B1 * | 3/2003 | Matsubara | 707/200 |
| 6,535,874 B2 * | 3/2003 | Purcell | 707/3 |
| 6,535,886 B1 * | 3/2003 | Koontz | 707/102 |

FOREIGN PATENT DOCUMENTS

| | | | |
|---|---|---|---|
| EP | 0230616 | 8/1987 | G06F/9/44 |
| JP | 1277932 | 11/1989 | G06F/7/28 |

OTHER PUBLICATIONS

Sujithan, An object model of data, based on the ODMG industry for database applications, International Seminar on Client/Server Computing, Seminar Proceedings (Digest No. 1995/184), IEE Colloquium on, vol. 1, Oct. 30–31, 1995, pp. 13/1–13/8.*

(List continued on next page.)

Primary Examiner—David Jung
(74) Attorney, Agent, or Firm—Gregory M. Plow

(57) ABSTRACT

A content reactive reload utility receives one or more content reactive user directives that may influence processing depending upon the content of a populated target database. Records are then read from an unload file and the IMS segments contained therein are written to the target database. If an IMS segment receives a duplicate error in attempting to perform the write operation because the segment already exists in the target database, then processing continues in accordance with the previously received user directives. The content reactive user directive may indicate that processing should be terminated, that processing should continue with the next segment from the unload file or that the duplicate segment should replace the like segment in the target database. In this manner, an unload file can be applied to a populated IMS database to achieve many common database management tasks with enhanced programmer productivity and improved processing efficiency.

30 Claims, 8 Drawing Sheets

OTHER PUBLICATIONS

Liu, A new organization of very large database, Southeastcon '93, Proceedings, IEEE, Apr. 4–7, 1993, 7 pages.*

Tan et al., Exploring into programs for the recovery of data dependencies designed, Knowledge and Data Engineering, IEEE Transactions on, vol. 14, Issue 4, Jul./Aug. 2002, pp. 825–835.*

T. L. Masemore; "SQLREORG–DBSPACE Reorganization Utility for SQL/DS Data Bases" IBM Technical Bulletin, vol. 33, No. 1A, Jun. 1990.

M. J. Anglin, K. H. Bishop, S. T. Garcia, K. S. Goldsmith, M. A. Haye, and M. A. Sovik "Changed Data Only Backup and Recovery" IBM Technical Bulletin, vol. 39, No. 03, Mar. 1996.

Internet: "IMS" Excerpt from http://www–4.ibm.com/software/data/ims.

Internet: "IMS Overview" Excerpt from http://www.compapp.dcu.ie/databases/f175.html.

Internet: "IMS Data Definition" Excerpt from http://www.compapp.dcu.ie/databases/f176.html.

* cited by examiner

SEGMENT CROSS REFERENCE TABLE EXAMPLE — 400

| SEGMENT CODE 410 | SEGMENT LEVEL 420 | PARENT CODE 430 | SEGMENT NAME 440 | SEGMENT ACTION KEYWORD 450 |
|---|---|---|---|---|
| 1 | 1 |   | SEGMENT1 |   |
| 2 | 2 | 1 | SEGMENT2 | IGNORE |
| 3 | 2 | 1 | SEGMENT3 |   |
| 4 | 2 | 1 | SEGMENT4 | BYPASS |
| 5 | 2 | 1 | SEGMENT5 | REPLACE |

Figure 4

|  | SEGMENT ACTION KEYWORDS | | | | | |
|---|---|---|---|---|---|---|
| | | TERMINATE 540 | IGNORE 545 | REPLACE 550 | BYPASS 555 | "NULL" 560 |
| GLOBAL ACTION KEYWORDS | TERMINATE 510 | FAIL ON DUP SEG | IGNORE DUP SEG | REPLACE DUP SEG | SKIP SEG | FAIL ON DUP SEG |
| | IGNORE 515 | FAIL ON DUP SEG | IGNORE DUP SEG | REPLACE DUP SEG | SKIP SEG | IGNORE DUP SEG |
| | REPLACE 520 | FAIL ON DUP SEG | IGNORE DUP SEG | REPLACE DUP SEG | SKIP SEG | REPLACE DUP SEG |
| | BYPASS 525 | FAIL ON DUP SEG | IGNORE DUP SEG | REPLACE DUP SEG | SKIP SEG | SKIP SEG |
| | "NULL" 530 | FAIL ON DUP SEG | IGNORE DUP SEG | REPLACE DUP SEG | SKIP SEG | FAIL ON DUP SEG |

METHOD, COMPUTER PROGRAM PRODUCT, AND SYSTEM FOR MODIFYING POPULATED DATABASES UTILIZING A RELOAD UTILITY

FIELD OF INVENTION

The present invention relates generally to Information Management System (IMS) databases in data processing systems. (IMS is a trademark of International Business Machines Corporation in the United States, other countries, or both.) More specifically, the present invention relates to a method and apparatus to assist database administrators in managing IMS databases requiring various management tasks such as replication, backup, restore, mass update, mass insert or merge operations.

BACKGROUND

IMS is a hierarchical database management system (HDBMS) developed by International Business Machines Corporation. IMS has wide spread usage in many large enterprises where high transaction volume, reliability, availability and seal ability are of the utmost importance. IMS provides base software and interfaces for running the businesses of many of the world's large corporations. However, companies incorporating IMS databases into their business models typically makes significant investments in IMS application programs in order to have IMS perform meaningful data processing work particularly tailored to the needs of their respective enterprises. IMS application programs are typically coded in COBOL, PL/I, C, PASCAL or assembly language. These application programs perform IMS database functions by making Data Language One (DL/I) calls to invoke the needed IMS processing.

Sometimes an application program is custom developed by a company for its exclusive use on a particular IMS system. However, there is a different class of application program known in the art as a tool, utility, or utility program (henceforth referred to as utility). These utilities are frequently developed by a software provider to perform tasks that are common in many IMS installations, thereby saving a significant amount of work otherwise expended in developing custom applications to perform very common tasks. For example, unloading and reloading IMS databases for the purposes of backup/recovery or database reorganization are very common tasks for which numerous unload/reload utilities are currently available.

The use of these utilities may save significant time when compared to the laborious process of developing comparable custom application programs. However, the unload/reload utilities, briefly discussed above and currently known in the art, have a significant limitation which renders these utilities unusable for many common database administration tasks. More specifically, this limitation mandates that the target database of a reload operation utilizing an unload file must not be populated (or, alternatively, must be empty) prior to initiating the reload operation. This significant limitation renders numerous database management tasks inappropriate for a unload/reload utility and thereby forces an enterprise to embark on expensive and time consuming custom database application programming endeavors to accomplish these database management tasks.

For example, merging two separate databases of similar structure into a single database cannot currently be accomplished by utilizing unload/reload since this operation necessarily requires a load into a populated database. Additional examples include mass update operations where an unload file contains replacement database records for corresponding records in an existing database; or, a mass insert operation where an unload file contains additional database records to be added to an existing database. In all of the above examples prior art unload/reload utilities cannot be deployed because the target database is populated, resulting in the loss of performance and efficiency advantages normally associated with the use of simple unload/reload utilities.

Accordingly, there is a need for an IMS unload/reload utility that can be used to accomplish a variety of database management tasks, including mass insert, mass update, database replication, database merge, database consolidation, database recovery and the like. It is highly desirable to enhance programmer productivity in the accomplishments of these tasks, as well as improve the processing efficiency of the computing system on which they are performed.

SUMMARY OF THE INVENTION

To overcome the limitations in the prior art briefly described above, the present invention provides a method, computer program product, and system for performing content reactive reload utility operations on populated IMS databases. More specifically, a content reactive reload utility receives one or more content reactive user directives that may influence processing depending upon the content of a populated target database. Records are then read from an unload file and the IMS segments contained therein are written to the target database. If an IMS segment receives a duplicate error in performing, or attempting to perform, the write operation (because the segment already exists in the target database), then processing continues in accordance with the previously received user directives. The content reactive user directive may indicate that processing should be terminated, that processing should continue with the next segment from the unload file or that the duplicate segment from the unload file should replace the like segment in the target database. In this manner, an unload file can be applied to a populated IMS database to achieve many common database management tasks with enhanced programmer productivity and improved processing efficiency.

Various advantages and features of novelty, which characterize the present invention, are pointed out with particularity in the claims annexed hereto and form a part hereof. However, for a better understanding of the invention and its advantages, reference should be made to the accompanying descriptive matter, together with the corresponding drawings which form a further part hereof, in which there is described and illustrated specific examples of preferred embodiments in accordance with the present invention.

BRIEF DESCRIPTION OF THE DRAWINGS

The preferred embodiments of the present invention will hereinafter be described in conjunction with the appended drawings, where like reference numbers denote the same element throughout the set of drawings:

FIG. 4 is an example of a segment cross reference table;

FIG. 5 is a table illustrating the interaction of global and segment level Action Keywords;

DESCRIPTION OF THE PREFERRED EMBODIMENTS

The preferred embodiment in accordance with the present invention is directed to a system, computer program product, and method for performing content reactive reload utility operations on populated IMS databases. The following description is presented to enable one of ordinary skill in the art to make and use the present invention and is provided in the context of a patent application and its requirements. Various modifications to the preferred embodiment will be readily apparent to those skilled in the art and the teaching contained herein may be applied to other embodiments. Thus, the present invention should not be limited to the embodiments shown but is to be accorded the widest scope consistent with the principles and features described herein.

Figure 1:
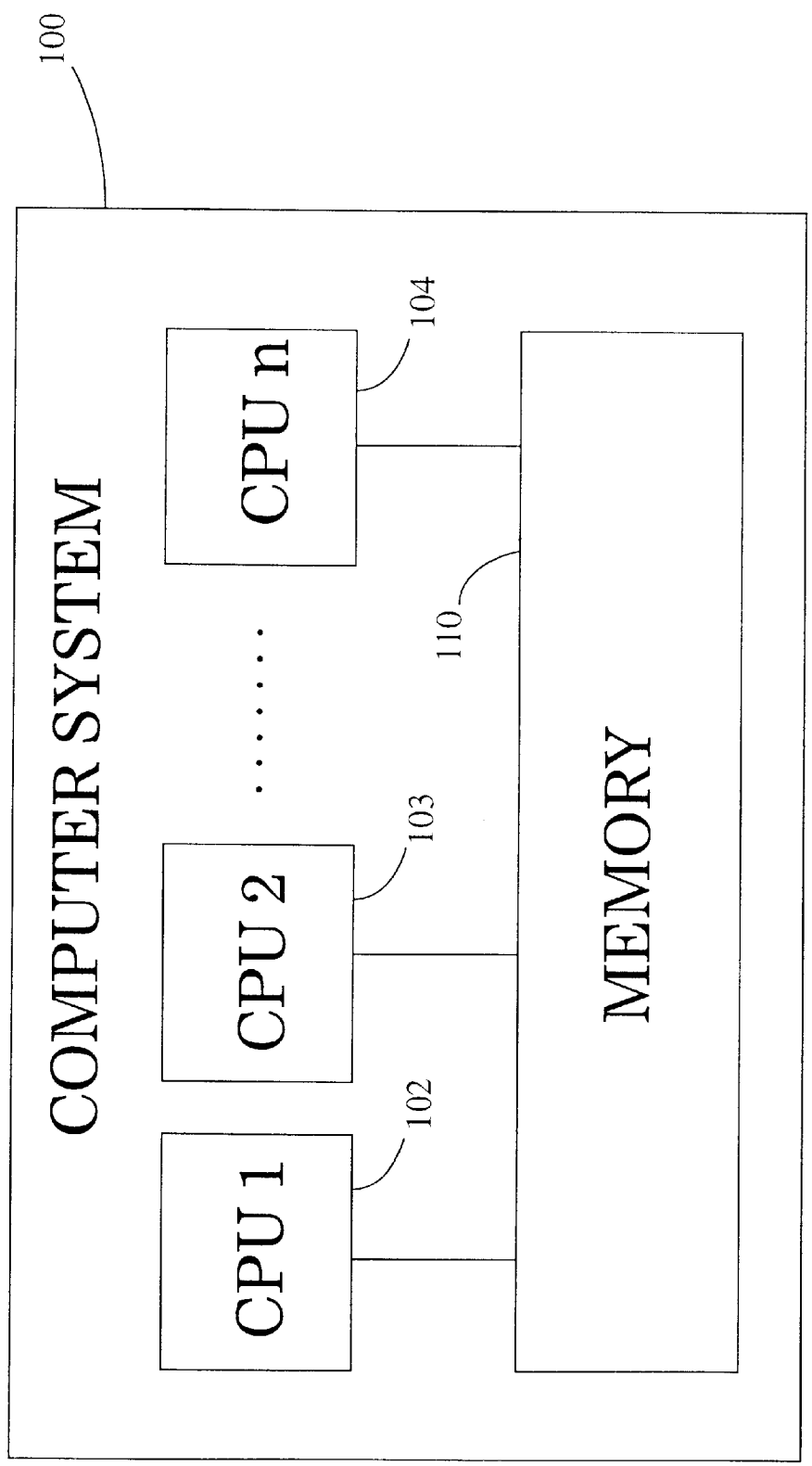
FIG. 1 is a block diagram of a typical computer system wherein the present invention may be practiced.

FIG. 1 is a block diagram of a computer system 100, such as the S/390 mainframe computer system. (S/390 is a registered trademark of International Business Machines Corporation in the United States, other countries, or both.) The computer system 100 comprises one or more central processing units (CPUs) 102, 103, and 104. The CPUs 102–104 suitably operate together in concert with memory 110 in order to execute a variety of tasks. In accordance with techniques known in the art, other components may be utilized with computer system 100, such as input/output devices comprising direct access storage devices (DASDs), printers, tapes, etc. (not shown). Although the preferred embodiment is described in a particular hardware environment, those skilled in the art will recognize and appreciate that this is meant to be illustrative and not restrictive of the present invention. Accordingly, other alternative hardware environments may be used without departing from the scope of the present invention.

Figure 2:
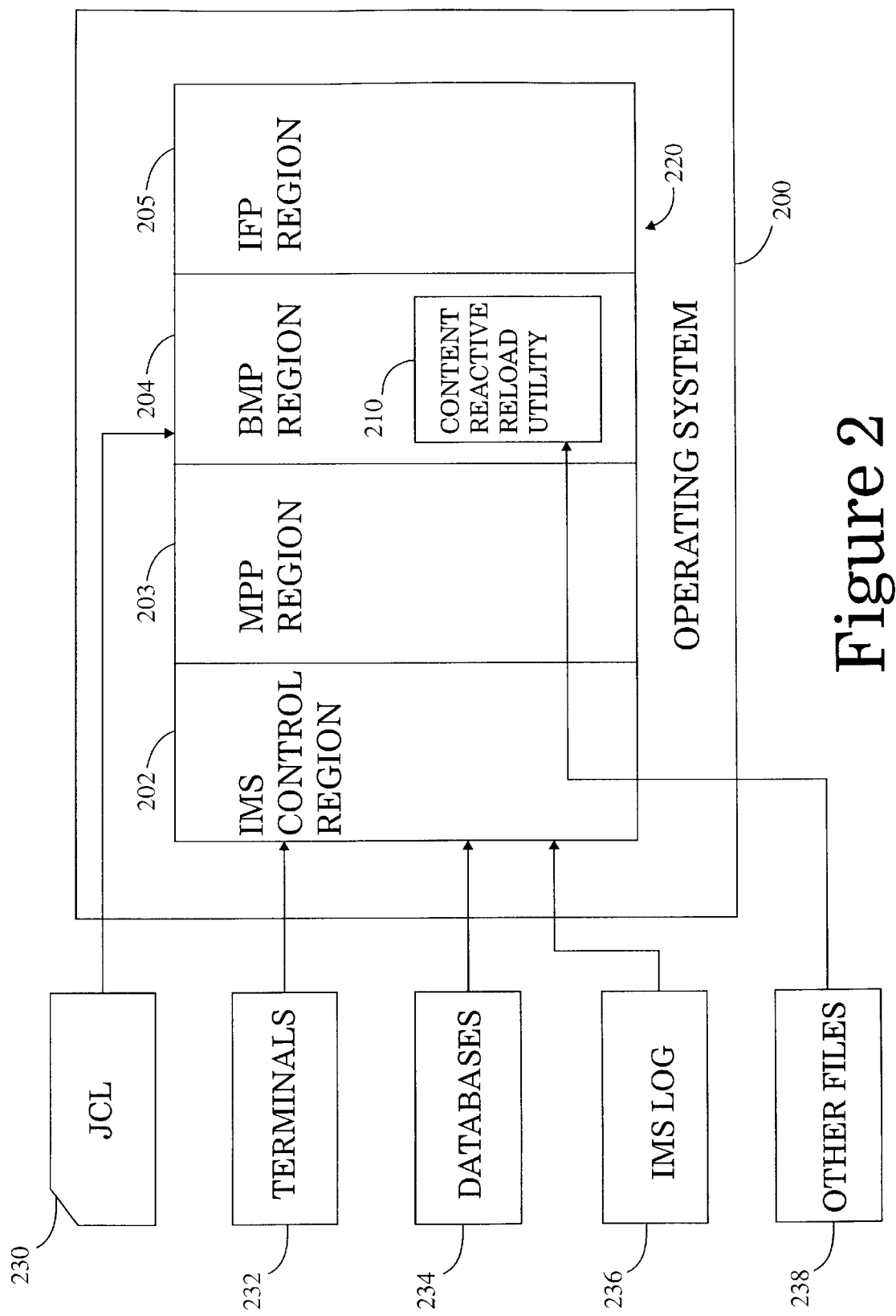
FIG. 2 is a block diagram of an exemplary IMS subsystem including a reload utility in accordance with one embodiment of the present invention.

Referring now to FIG. 2, a block diagram is shown illustrating an exemplary operating system 200, such as the MVS/ESA operating system, suitable for managing the resources of computer system 100 and providing the framework for running other computing subsystems and application programs. (MVS/ESA is a trademark of International Business Machines Corporation in the United States, other countries, or both.) Subsystems functionally capable of being provided under the MVS/ESA operating system include the IMS subsystem 220. The IMS subsystem 220 comprises an IMS control region 202, which manages the region resources comprising Message Processing Program (MPP) region 203, Batch Message Processing (BMP) region 204, and Interactive Fast Path (IFP) region 205. Other resources that communicate with, or are managed by, IMS control region 202 comprise terminals 232, databases 234, logs 236, control files 238 and job control language (JCL) 230. Databases 234 may comprise several different types of IMS databases, such as DEDB, HDAM, HIDAM and HISAM.

BMP region 204 is eligible for running utilities in accordance with the preferred embodiment. BMP region 204 comprises a content reactive reload utility 210 invoked as a BMP batch application program via JCL 230. Other files 238 (explained in more detail below in conjunction with FIG. 3) provide additional input and direction to reload utility 210. Those of ordinary skill in the art will recognize that FIG. 2 is exemplary in nature and that many other IMS subsystem configurations are possible within the scope of the present invention. For example, in an alternative configuration IFP region 205 need not exist and other regions, such as an IMS DLI or DBB region, could exist. Further, content reactive reload utility 210 may run as a DLI/DBB under operating system 200 wherein regions 202–205 need not be present at all.

Generally, content reactive reload utility 210 is tangibly embodied in and/or readable from a computer-readable medium containing the program code (or alternatively, computer instructions), which when read and executed by computer system 100 causes computer system 100 to perform the steps necessary to implement and/or use the present invention. Thus, the present invention may be implemented as a method, an apparatus, or an article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Examples of a computer readable device, carrier or media include, but are not limited to, palpable physical media such as a CD ROM, diskette, hard drive and the like, as well as other non-palpable physical media such as a carrier signal, whether over wires or wireless, when the program is distributed electronically.

Figure 3:
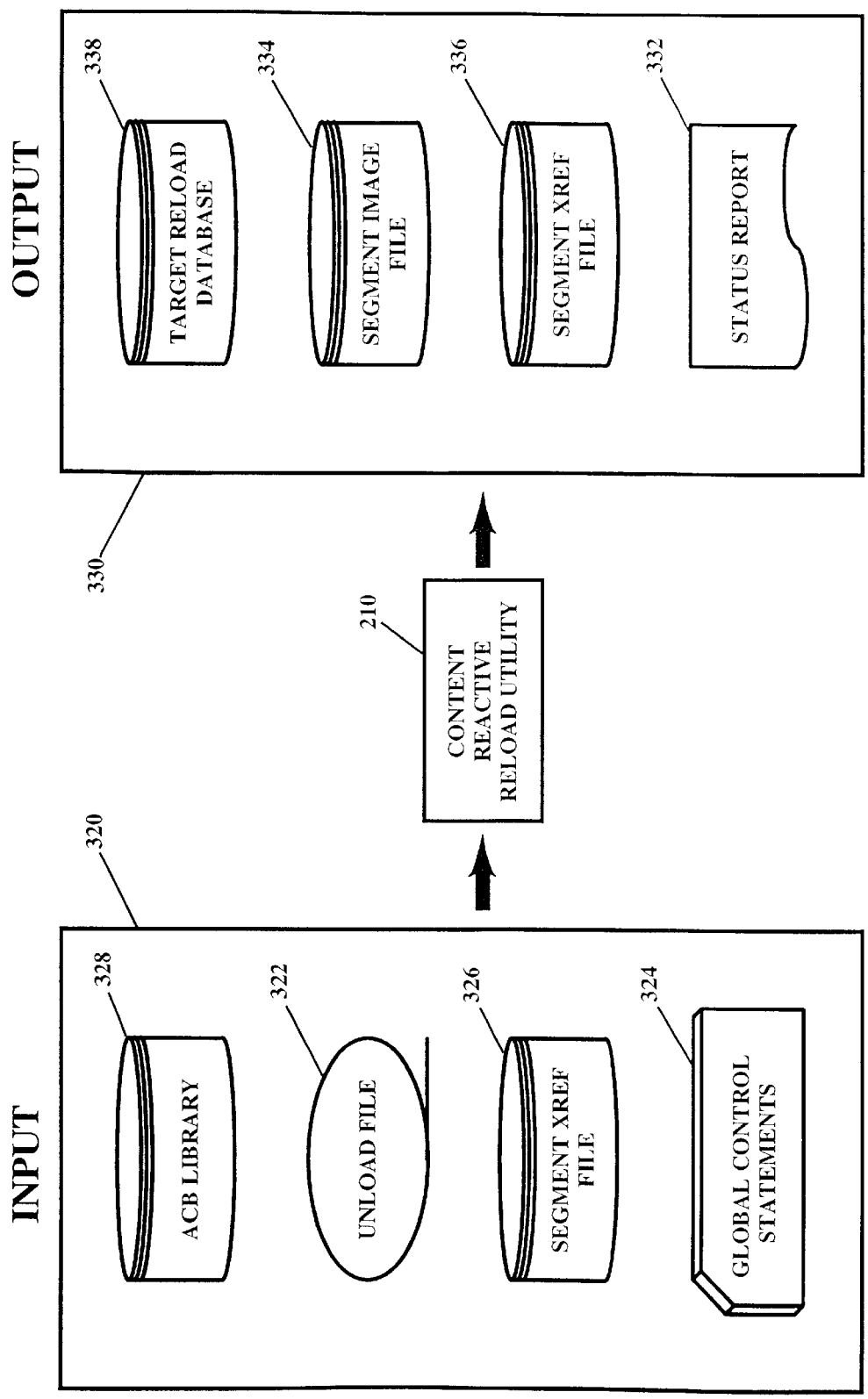
FIG. 3 is an input/output diagram illustrating reload processing in accordance with one embodiment of the present invention.

Referring now to FIG. 3, an input/output diagram 300 is shown. Content reactive reload utility 210 processes input 320 and generates output 330. Input 320 comprises a set of unloaded IMS segments within unload file 322, global control statements 324, input segment cross reference file 326, and database definition information 328. Unload file 322 comprises a sequential string of IMS segments that have been "unloaded" from an IMS database and together form a sequential file to be processed by utility 210. This sequential file is typically generated by the use of an unload utility; however, those skilled in the art will recognize that the unload records may be generated by a variety of programming techniques, including custom application programs that operate on IMS databases or further process previously created unload files.

Global control statements 324 are options and attributes that are directed to the overall reload operation and, absent conflicting attributes at the segment level, are operative for all segments to be processed by the reload utility. These attributes include global content reactive user directives (also referred to as global directives) which, in the preferred embodiment, take the form of Global Action Keywords. These global directives are fully discussed in conjunction with FIG. 5 below.

Input segment cross reference file 326 is optional, but when provided comprises a segment cross reference table including segment affiliated content reactive user directives (also referred to as segment directives) which, in the preferred embodiment, take the form of Segment Action Keywords. These segment directives, which are discussed below in conjunction with FIG. 5, are operative only for the IMS segments for which they have an affinity.

Database definition information 328 describes the characteristics of the database to be reloaded. This information generally includes attributes related to segment keys and segment hierarchy. Those of ordinary skill in the art will recognize that this information may be obtained from a variety of sources including, for example, the Database Definition (DBD), the Application Control Block (ACB) or from information captured and generated during the operation of the unload utility.

Output 330 comprises report 332, segment image file 334, output segment cross reference file 336, and reloaded database 338. Report 332 provides valuable information to the user of the reload utility pertaining to the status of the reload utility execution. Report 332 may contain varied information such as diagnostic messages, statistics and utility execution status.

Segment image file 334 is optional, but when provided comprises the IMS segments successfully processed by the reload utility. A segment within file 334 may comprise an actual image of the IMS segment or portion thereof, or information that is representative of the segment or portion thereof. Output segment cross reference file 336 is optional, but when provided comprises IMS segment code and IMS segment name data.

Reloaded database 338 is the IMS database as loaded, appended or updated by the content reactive reload utility 210 in response to processing unload records 322. Database 338 is an IMS Full Function or IMS Fast Path DEDB database.

Referring now to FIG. 4, an example of a segment cross reference table 400 contained within file 326 is shown. Segment code 410 is the unique code identifier for the associated segment assigned to every segment type by IMS. Segment level 420 identifies the hierarchical level of the associated segment within the IMS database hierarchy wherein the root segment has a level of 1 and the deepest level within the hierarchy has a level of n wherein n is the number of levels within the IMS database hierarchy. Parent code 430 specifies the segment code for the immediate parent of the associated segment. Segment name 440 is the name of the segment as defined by the database administrator that established the IMS database. Segment Action Keyword 450 is optionally specified and when present specifies the particular action to be taken for the associated segment. These Segment Action Keywords are described below in conjunction with FIG. 5. Other information, not shown in segment cross reference table 400, may also be included. For example, table 400 may also include segment type, segment format, and segment length.

Referring now to FIG. 5, table 500 is shown to describe the interaction between Global Action Keywords 510–530 and Segment Action Keywords 540–560 wherein, for a given segment to be processed, a single Action Keyword (also referred to as the operative directive) is determined. All Action Keywords, independently of whether they belong to the class of global directives or the class of segment directives, have identical definitions excepting only their scope of application. Global Action Keywords potentially apply to every segment processed by the reload utility 210 whereas Segment Action Keywords apply to only the specific IMS segment associated with each keyword specification.

The Terminate Action Keyword 510, 540 specifies that reload utility 210 processing must terminate upon encountering a duplicate segment when inserting a segment from unload file 322 into reload database 338. This condition is detected by reload utility 210 when an 'II' status code is returned from a DLIISRT call during insert processing.

The Ignore Action Keyword 515, 545 specifies that reload utility 210 must ignore duplicate segments from unload file 322 when inserting into reload database 338. This condition is detected by reload utility 210 when an 'II' status code is returned from a DLIISRT call during insert processing. Reload utility 210, upon encountering this condition, will retain current positioning within the IMS database by use of a DLIGHU call and then continue processing with the next sequential segment from unload file 322.

The Replace Action Keyword 520, 550 specifies that reload utility 210 must replace duplicate segments from unload file 322 into reload database 338. This condition is detected by reload utility 210 when an 'II' status code is returned from a DLIISRT call during insert processing. Reload utility 210, upon encountering this condition, will perform a DLIGHU call followed by a DLIREPL call to replace the duplicate segment in reload database 338 with the corresponding segment from unload file 322.

The Bypass Action Keyword 525, 555 specifies that reload utility 210 should skip the processing of an IMS segment from unload file 322 and simply proceed to the next sequential segment within the unload file. Therefore, when this Action Keyword is in effect, reload utility 210 bypasses the DLIISRT call for the associated unload segment thereby eliminating any possibility of encountering a duplicate error condition.

The "Null" Action Keyword 530, 560 is not an actual keyword but rather is used in table 500 to represent the default action established by reload utility 210 in those circumstances where a global directive or segment directive was not explicitly specified.

Since Action Keywords may be specified by the user of reload utility 210 as either Global Action Keywords, Segment Action Keywords, or both, it is necessary for reload utility 338 to determine a singular Action Keyword (or default process) that will be in effect for the processing of each segment within the unload file 322. Table 500 specifies the processing to be performed for all combinations of Global and Segment Action Keywords or defaults. For any combination of Global and Segment Action Keywords, the corresponding resulting action is found by obtaining the intersecting cell from table 500 utilizing the column and row corresponding to the selected Action Keywords.

While table 500 explicitly specifies the processing for all combinations, the derivation of table 500 results from a few simple rules. First, an explicit Segment Action Keyword always takes priority over any Global Action Keyword. This rule provides the user of reload utility 210 with the ability to easily specify the processing to be performed on most segments, with the capability of specifying the minority of exception cases via the Segment Action Keywords. This rule becomes evident by observing that all entries for any given column, excluding only the "NULL" column, is identical implying that it is the explicit Segment Action Keyword that prevails over the Global Action Keyword when any conflict of keywords for a particular segment is present.

Second, wherever a Segment Action Keyword has not been specified (the column beneath the "NULL" 560 heading) the processing to be performed by reload utility 210 is governed by the Global Action Keyword specification. This rule becomes evident by observing that all entries beneath the "NULL" 560 heading reflect the action of the Global Action Keyword in the corresponding row.

Third, for each segment without a corresponding Global Action Keyword or Segment Action Keyword (i.e. "null"/

"null" intersect from table 500), the default processing for reload utility 210 is to terminate processing in the presence of duplicate segments, as discussed supra.

While table 500 explicitly specifies processing for all combinations of Global and Segment Action Keywords, those of ordinary skill in the art will recognize that many variations for table 500 are possible. For example, in another embodiment of the present invention, the "null" Action Keyword may specify that a duplicate record in reload database 338 should be replaced rather than have processing terminated. Further, additional Action Keywords could be defined or some previously defined Action Keywords could be eliminated. These and other variations are possible as long as the processing to be performed by reload utility 210 upon encountering duplicate segments is clearly defined and known by the user of reload utility 210.

Figure 6:
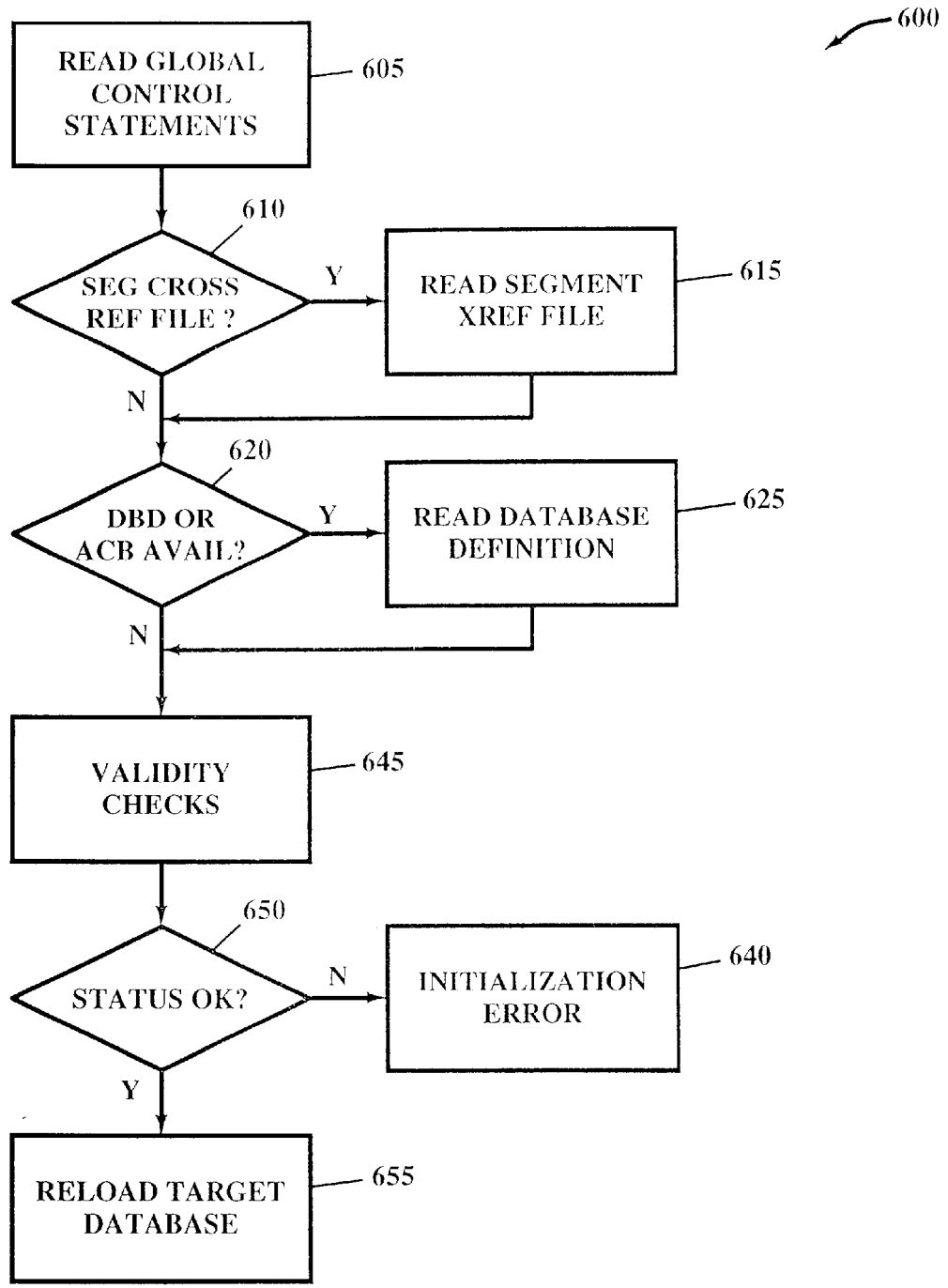
FIG. 6 is a flow diagram illustrating reload initialization processing in accordance with one embodiment of the present invention.

Referring now to FIG. 6, flow diagram 600 illustrates the initialization processing performed by the preferred embodiment of reload utility 210 whereby various validity checking of options is performed. Step 605 reads global control statements 324 and, in step 610, it is determined if there is a global control statement reflecting the existence of a segment cross reference file 326. If a specification for segment cross reference file 326 is found, then, in step 615, the segment cross reference file is read and processing continues with step 620.

Returning now to step 610, if a global control statement cannot be found for a segment cross reference file, then processing proceeds with step 620 wherein it is determined if a database definition is available via a DBD or ACB. If a database definition exists, then in step 625 the database definition is read wherein certain information pertaining to the structure and organization of the IMS database 338 is obtained before proceeding to step 645.

Returning now to step 620, if a database definition is not available to reload utility 210, then processing proceeds with step 645 to perform initialization validity checking. Those of ordinary skill in the art will recognize that many variations are possible with respect to initialization validity checking. For example, a software engineer may decide to give more flexibility to the user of reload utility 210 wherein less rigorous validity checking is performed but greater risk of database corruption occurs with corresponding additional responsibility placed on the user to fully comprehend the processing for a given set of specifications and so intend the subsequent result. The preferred embodiment performs a consistency check to ensure that specifications, if present, in database definition 328 do not conflict with specifications, if present, in segment cross reference file 326. For example, a terminating error condition would result if a segment was declared as a keyed segment in one specification and the same segment declared as an unkeyed segment in another specification. The preferred embodiment also checks to ensure that all segments, for which the operative directive REPLACE is in effect, are keyed segments and that the parents of these segments are also keyed.

Continuing with step 650, a determination is made as to whether or not all validity checks have been successful and, if so, processing proceeds with step 655 wherein the target database 338 is reloaded, as further explained below in conjunction with FIG. 7. If one or more validity checks have failed, control passes back to step 640 wherein an initialization error is generated and the processing otherwise intended to be performed by reload utility 210 is aborted.

Those of ordinary skill in the art will recognize that it is possible to delay many initialization procedures to the point in time at which reload processing cannot continue further until the omitted initialization processing is performed. This delayed point may, in some circumstances, not occur until after the actual process of inserting segments into the target reload database 338 has begun. These and many other variations are possible in performing initialization processing without departing from the spirit and scope of the present invention.

Figure 7:
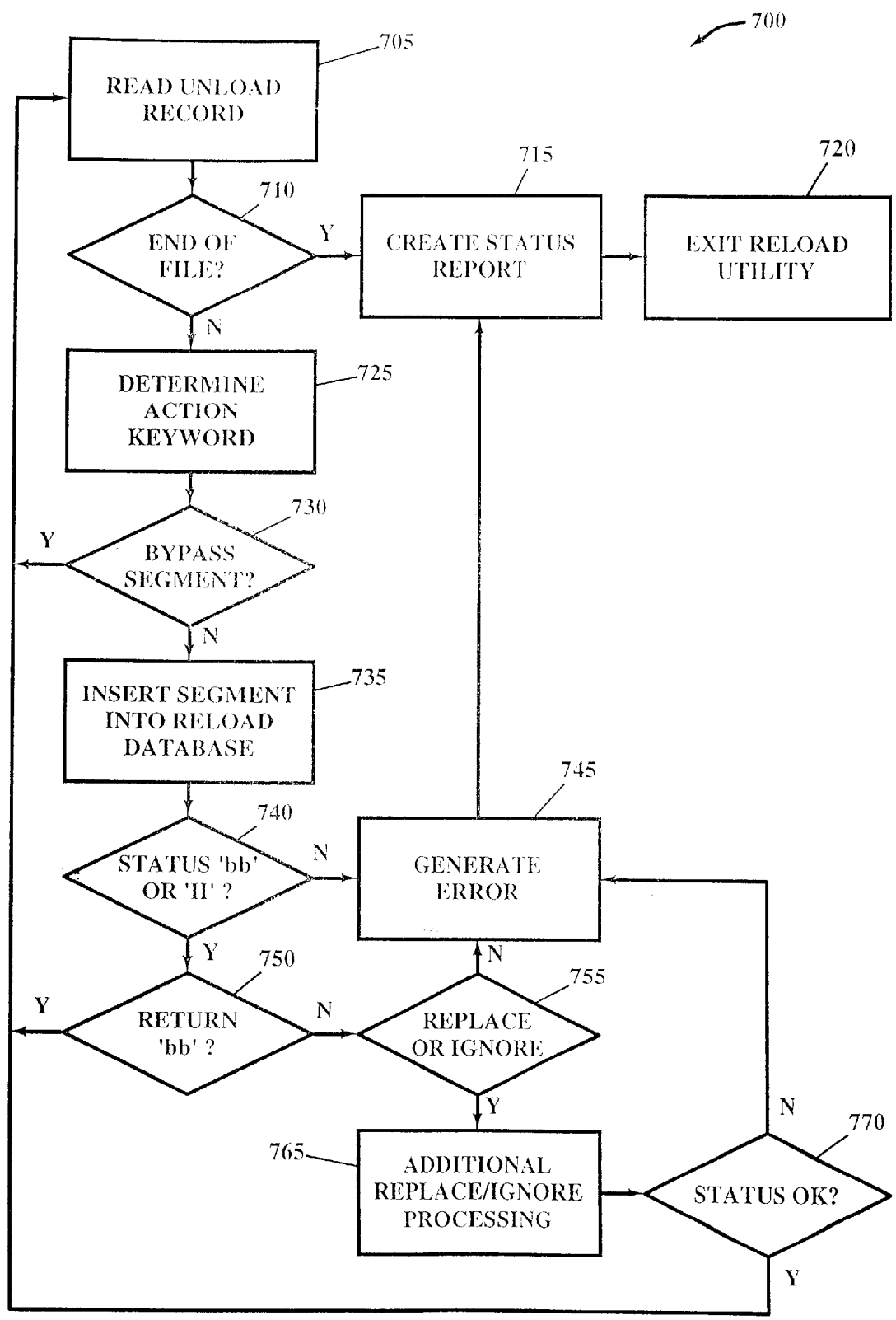
FIG. 7 is a flow diagram illustrating reload processing in accordance with one embodiment of the present invention.

Referring now to FIG. 7, flow diagram 700 illustrates the processing performed by the preferred embodiment of reload utility 210 following the initialization processing described supra, wherein reload database 338 is reloaded utilizing the IMS segments in unload file 322. Step 705 reads the first or next segment from unload file 322 and, in step 710, it is determined if the end of unload file 322 has been reached wherein a segment cannot be read because all segments were previously processed or unload file 322 is empty. If the next segment exists processing continues with step 725, otherwise, in step 715, status report 332, reflecting the results of reload utility 210 execution, is generated and in step 720 reload utility 210 exits and returns control to the operating system 200.

Continuing now with step 725, Global Action Keywords and Segment Action Keywords are evaluated according to table 500 of FIG. 5 in order to arrive at a singular reload action to be in effect for the processing of the current IMS segment from reload file 322. If BYPASS is operative for the current IMS segment then control returns to step 705. Otherwise processing continues with step 735 wherein a DLIISRT CALL is utilized to insert the current IMS segment into reload database 338.

In step 740, the status of the DLIISRT call is queried to determine if the status is either 'bb' (a successful insert operation) or 'II' (a duplicate segment condition detected). If either the successful or duplicate condition is detected, then processing continues with step 750, otherwise, in step 745, an error condition is generated and control then passes to step 715.

Returning now to step 750, a test is made for a status of 'bb', reflecting a successful insert operation. If the insert was successful, then control returns to step 705 to read and process the next IMS segment from unload file 322. Otherwise, in step 755, a test is made to determine if either REPLACE or IGNORE is operative for the current IMS segment. If so, in step 765, additional processing is performed for the current segment (as more fully described below in conjunction with flow diagram 800 from FIG. 8); otherwise processing proceeds from step 755 to step 745 to process a duplicate error condition.

Returning now to step 765, at the completion of REPLACE/IGNORE processing, a test is made in next the step 770, to ensure that REPLACE/IGNORE processing was successful. If successful, then control returns to step 705 to read the next IMS segment; otherwise control passes to step 745 to process a REPLACE/IGNORE processing error.

Figure 8:
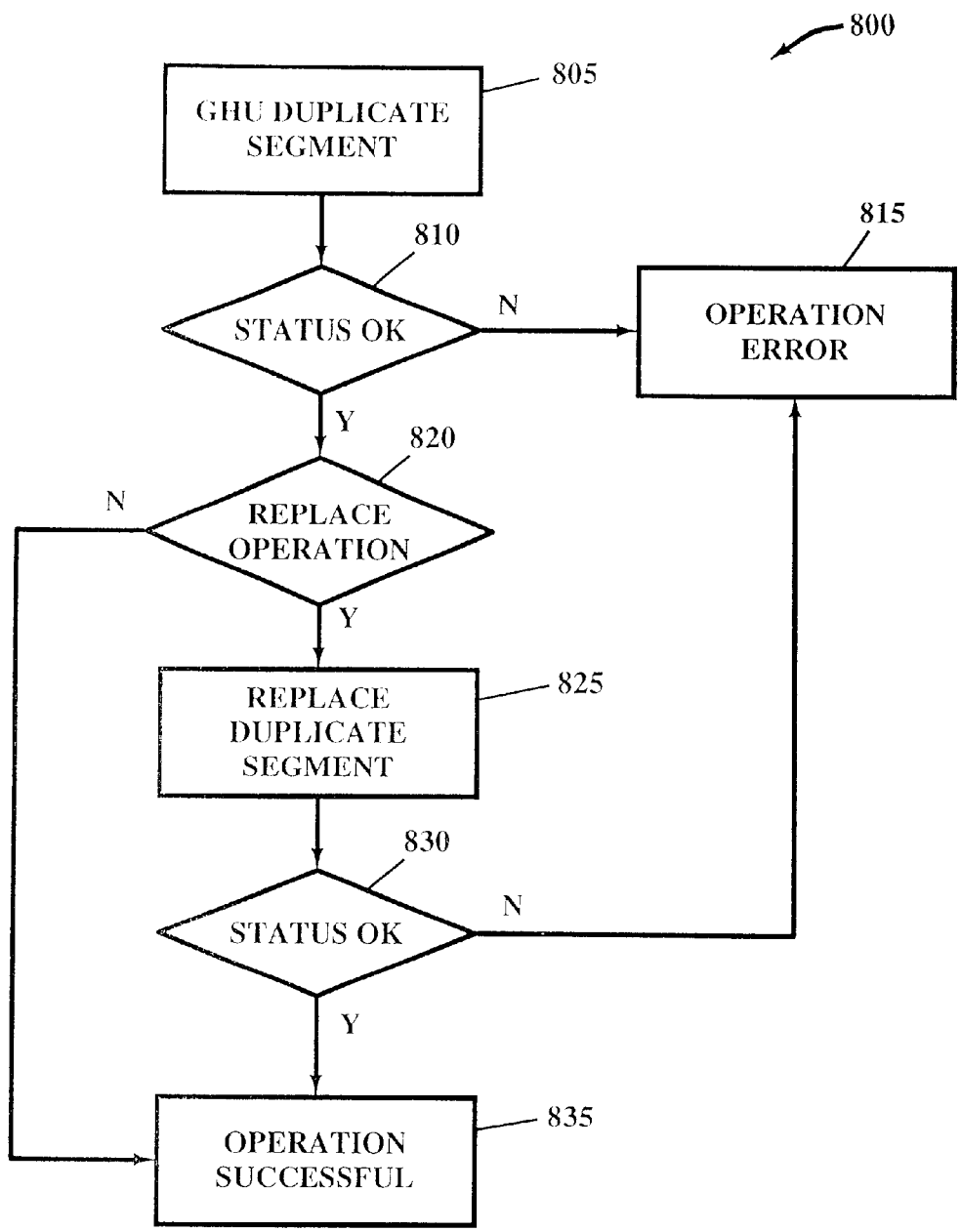
FIG. 8 is a flow diagram illustrating additional processing detail for reload processing in accordance with one aspect of the present invention.

Referring now to FIG. 8, flow diagram 800 illustrates the additional details of step 765 from flow diagram 700 wherein REPLACE/IGNORE processing is performed for duplicate IMS segments. In step 805 a DLI GHU (Get Hold Update) call is utilized to establish positioning to the duplicate IMS segment within reload database 338 and to prepare for a possible update of the duplicate IMS segment with the corresponding segment from the unload file 322. In step 810 a check is made to ensure that the GHU processing was successful and, if so, continue processing with step 820. If the GHU processing was not successful, then an operation error is generated and further processing occurs as explained supra in step 770 of flow diagram 700.

Returning now to step 820, a test is made to determine if REPLACE is operative for the current duplicate IMS segment. If so, a DLIREPL call is made in step 825 to replace the duplicate segment in reload database 338 with the corresponding segment from unload file 322. Otherwise, it must follow that IGNORE is operative for the current IMS segment and accordingly, having already reestablished positioning within reload database 338 in previously executed step 805, control passes now to step 835 where a successful REPLACE operation is indicated.

Returning now to step 830 a test is made to determine if the IMS duplicate segment in reload database 338 was successfully replaced in step 825. If so, a successful REPLACE operation is indicated in step 835 to be further processed by step 770 of flow diagram 700, as explained supra. Otherwise control passes to step 815 where an operation error is generated.

Taken in combination flow diagrams 600, 700 and 800, shown in FIGS. 6, 7 and 8, respectively, provide for enhanced programmer productivity by enabling unload/reload utilities to greatly expand their scope of operation to include a number of database management operations that were heretofore unavailable to this class of utility. These database management operations include database merge, database mass insert, database mass update, database consolidation and other database management tasks involving reloading into a populated database.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. '112, sixth paragraph, unless the element is expressly recited using the phrase "means for" or "step for."

While the preferred embodiment of the present invention has been described in detail, it will be understood that modification and adaptations to the embodiment(s) shown may occur to one of ordinary skill in the art without departing from the scope of the present invention as set forth in the following claims. Thus, the scope of this invention is to be construed according to the appended claims and not just to the specific details disclosed in the exemplary embodiments.

What is claimed:

1. A method for performing on a computer system one or more database management tasks on a populated IMS database, comprising the steps of:
   (a) receiving a content reactive user directive,
   (b) reading a segment from an unload file,
   (c) writing said segment from said unload file to said IMS database, and
   (d) reacting to a duplicate segment error in said populated IMS database wherein said error is processed in accordance with said content reactive user directive.

2. The method of claim 1 wherein said content reactive user directive comprises a segment directive.

3. The method of claim 2 wherein said content reactive user directive further comprises a global directive.

4. The method of claim 3 wherein said global directive is a Global Action Keyword and said segment directive is a Segment Action Keyword.

5. The method of claim 1 wherein said IMS database is a plurality of IMS databases and said database management task merges two populated IMS databases from said plurality of IMS databases into a single IMS database.

6. The method of claim 3 wherein said reaction to said duplicate segment error is determined by an operative directive which is derived from said global directive and said segment directive.

7. The method of claim 6 wherein said operative directive is equivalent to said segment directive.

8. The method of claim 6 wherein said segment directive is not explicitly specified and said operative directive is equivalent to said global directive.

9. The method of claim 1 wherein said writing step comprises an unsuccessful attempt to write said segment from said unload file to said IMS database.

10. A method for performing a database management task on a populated IMS database utilizing a content reactive reload utility comprising the steps of:
    (a) providing at least one content reactive user directive and a reload file that is accessible to said content reactive reload utility, and
    (b) executing, on a computer system, said content reactive reload utility for performing said database management task on said populated IMS database.

11. The method of claim 10 wherein said content reactive user directive is a BYPASS keyword and said populated IMS database excludes at least one segment from said reload file following normal completion of said database management task.

12. A method for performing on a computer system one or more database management tasks on a populated database, comprising the steps of:
    (a) reading content reactive user directives,
    (b) reading records from an unload file,
    (c) writing at least a subset of said records from said unload file to said database, and
    (d) reacting to a duplicate record error in said populated database wherein the processing for said error depends from at least one of said content reactive user directives.

13. A computer system for performing one or more database management tasks on a populated IMS database, comprising:
    (a) a computer,
    (b) means for receiving a content reactive user directive,
    (c) means for reading a segment from an unload file,
    (d) means for writing said segment from said unload file to said IMS database, and
    (e) means for reacting to a duplicate segment error in said populated IMS database wherein said error is processed in accordance with said content reactive user directive.

14. The system of claim 13 wherein said content reactive user directive comprises a segment directive.

15. The system of claim 14 wherein said content reactive user directive further comprises a global directive.

16. The system of claim 15 wherein global directive is a Global Action Keyword and said segment directive is a Segment Action Keyword.

17. The system of claim 13 wherein said IMS database is a plurality of IMS databases and said database management task merges two populated IMS databases from said plurality of IMS databases into a single IMS database.

18. The system of claim 15 wherein said reaction to said duplicate segment error is determined by an operative directive which is derived from said global directive and said segment directive.

19. The system of claim 18 wherein said operative directive is equivalent to said segment directive.

20. The system of claim 18 wherein said segment directive is not explicitly specified and said operative directive is equivalent to said global directive.

21. The system of claim 13 wherein said writing means comprises an unsuccessful attempt to write said segment from said unload file to said IMS database.

22. An article of manufacture for use in a computer system tangibly embodying a program of instructions executable by said computer system to perform method steps for loading a populated IMS database, comprising:
   (a) receiving a content reactive user directive,
   (b) reading a segment from an unload file,
   (c) writing said segment from said unload file to said IMS database, and
   (d) reacting to a duplicate segment error in said populated IMS database wherein said error is processed in accordance with said content reactive user directive.

23. The article of manufacture of claim 22 wherein said content reactive user directive comprises a segment directive.

24. The article of manufacture of claim 23 wherein said content reactive user directive further comprises a global directive.

25. The article of manufacture of claim 24 wherein said global directive is a Global Action Keyword and said segment directive is a Segment Action Keyword.

26. The article of manufacture of claim 24 wherein said reaction to said duplicate segment error is determined by an operative directive which is derived from said global directive and said segment directive.

27. The article of manufacture of claim 26 wherein said operative directive is equivalent to said segment directive.

28. The article of manufacture of claim 26 wherein said segment directive is not explicitly specified and said operative directive is equivalent to said global directive.

29. The article of manufacture of claim 22 wherein said IMS database is a plurality of IMS databases and said database management task merges two populated IMS databases from said plurality of IMS databases into a single IMS database.

30. The article of manufacture of claim 22 wherein said writing step comprises an unsuccessful attempt to write said segment from said unload file to said IMS database.

* * * * *